L. S. BACHE.
OILLESS SPINDLE.
APPLICATION FILED OCT. 15, 1915.

1,204,115.

Patented Nov. 7, 1916.

WITNESSES
J. Clyde Ripley
C. Remond

INVENTOR
Leigh S. Bache,
BY
J. H. Bache
ATTORNEY

UNITED STATES PATENT OFFICE.

LEIGH S. BACHE, OF MIDDLESEX BOROUGH, NEW JERSEY, ASSIGNOR OF ONE-HALF TO BOUND BROOK OIL-LESS BEARING COMPANY, OF BOUNDBROOK, NEW JERSEY, A CORPORATION OF NEW JERSEY.

OILLESS SPINDLE.

1,204,115.

Specification of Letters Patent.

Patented Nov. 7, 1916.

Application filed October 19, 1915. Serial No. 56,803.

*To all whom it may concern:*

Be it known that I, LEIGH S. BACHE, a citizen of the United States, and a resident of the borough of Middlesex, county of Middlesex and State of New Jersey, have invented certain new and useful Improvements in Oilless Spindles, of which the following is a full, clear, and exact description, whereby anyone skilled in the art may make and use the same.

The invention relates to oilless spindles and more particularly to the bearing for the spindle blade. The bearing is of a form which may be utilized in any desired form of spindle where there is a side bearing as well as a step or thrust bearing.

The object of the invention is to provide a self-lubrication for the spindle blade which has such characteristics that through rotation of the spindle, the lubrication will be supplied to the desired and exact degree necessary without requiring oil baths or any lubricating material other than that inherently held in the bearing.

A further object is to provide for lubricating the blade under the action of the generated heat produced by the rapid rotation of the spindle within the spindle bearing, and to further provide in conjunction therewith an adjustable anti-friction thrust member appurtenant to the heat generating elements of the spindle bearing.

The device hereinafter described, while of the same general character as that described in my application filed March 6, 1914, Serial No. 822,912, is an improvement thereon, devised to eradicate certain friction as compared with the device of my prior application.

Figure 2:
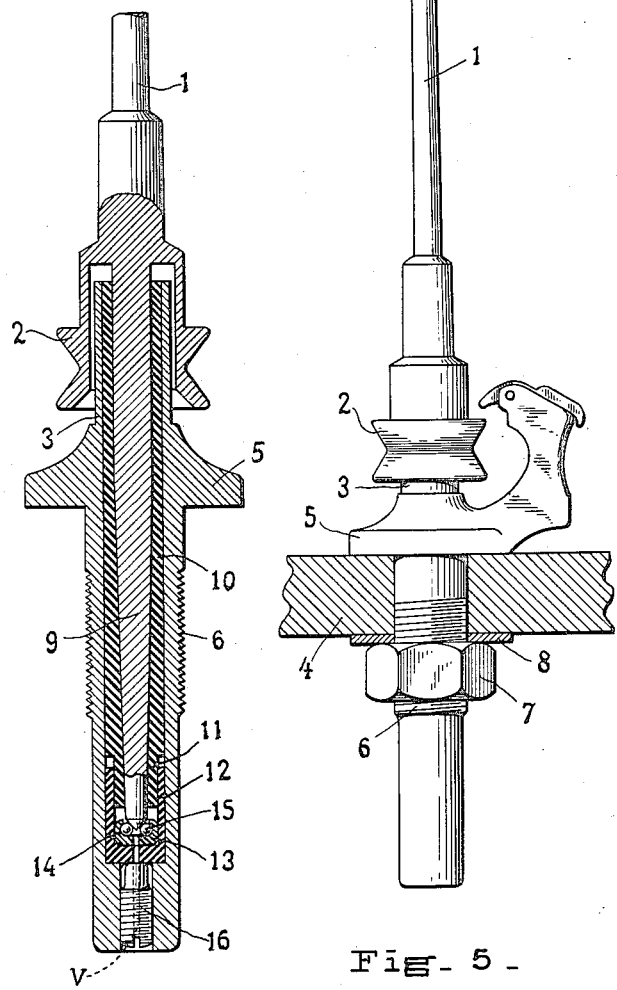
Figure 1:
Figure 3:
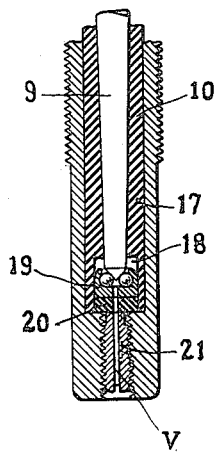
Figure 4:
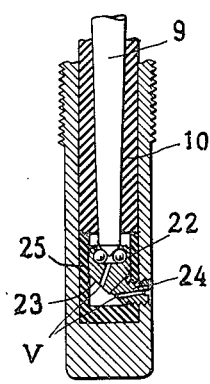
Figure 5:
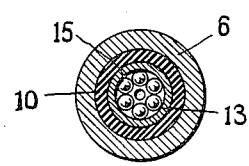

Referring to the drawings: Figure 1 is a view in side elevation of a spindle of well-known type embodying the invention. Fig. 2 is a vertical sectional view through the spindle, cup, whirl, bolster and step bearing on enlarged scale. Fig. 3 is a similar view illustrating the step adjusted by an insulating plug. Fig. 4 is a similar view illustrating a modified form of adjustment for the step. Fig. 5 is a cross sectional view through the step bearing.

The invention is illustrated herein in connection with a well-known and ordinary type of spindle embodying a whirl, a spindle blade, a bolster and step bearing with a cup inclosing the bolster and step bearing. It has been an ordinary practice, in such devices, to utilize the cup as an oil-receptacle for holding a lubricating bath in which all of the several parts are subject to immersion in a lubricating fluid.

The present device differs from others having fibrous packings and wickings combined with metals to form bolster bearings adapted to be run in an oil bath for the purpose of properly lubricating the spindle and keeping it cool.

The main object of the present invention is to obviate the necessity of liquid lubricants, and a most important object is to provide for a step bearing and an adjustment of the parts of the step, certain parts of which are formed of fibrous material completely and thoroughly impregnated with a lubricant of high melting point, so that the inherent qualities of the lubricating elements may be best applied.

The main bearing parts formed from the impregnated material give a complete and substantially perfect lubrication to the spindle, and this is effected by providing an anti-friction metallic step bearing, so combined with the fibrous material and made adjustable, that there is no possibility of the blade becoming depressed or sinking into the fibrous bolster bearing to such an extent as to cause undue friction of the blade with reference to the bolster. To accomplish the results, the bearing portion of the step is of an anti-friction character, although formed of metal, and is so correlated to the self-lubricating material and the end of the bolster that it will maintain the blade in a predetermined position and will prevent the blade, upon wear, from dropping down into the bolster. Friction between the blade and metallic step is relied upon to provide just a sufficient amount of heat for securing the best lubricating conditions without causing any wear between the end of the blade and the step. The anti-friction step member is made adjustable so that the spindle blade may be set to a nicety in the bolster.

The anti-friction bearing hereinafter described serves not only as a step bearing for the end of the spindle blade but has a distinct function as a distributer for the lubricant which is caused to exude from the impregnated material under the heat produced by the initial friction.

Referring to the drawings, the numeral 1, denotes the spindle blade which is provided with the usual whirl 2, encircling the upper end of the oil cup 3. The oil cup is mounted in a spindle rail 4, and has a shoulder 5, resting thereon with the dependent cup member 6, extending below the rail and secured thereto in any suitable manner as by a nut 7, and gasket or washer 8. Within the oil cup and surrounding the lower end 9, of the spindle, there is arranged a tapered bolster bearing 10. This bolster is formed of a fibrous material impregnated with fatty acids, waxes and mineral and vegetable oil, the aggregate consistency of which requires a substantially high melting point to secure a flow of the materials.

The bolster 10, exactly fits within the cup and has a taper corresponding to the taper of the spindle. As illustrated in Fig. 2 it has a reduced portion 11, which fits within a step or bearing cup 12, formed of the same material, said cup being adjustable with reference to the spindle and the bolster. Resting within the cup 12, is an anti-friction bearing 13, which may be of any desired type or form, but in preference consists of a race 14, containing balls 15. This anti-friction bearing is made adjustable with reference to the end of the spindle through an adjusting screw 16, which bears against the underside of the fibrous cup 12. The purpose and function of the anti-friction bearing within the step-cup 12, is to prevent sinking of the spindle blade 9, into the bolster 10. The bolster and spindle are tapered to fit and when in alined and fitting position they run with exactitude. Obviously, if the spindle was permitted to drop down into the bolster with undue weight, a frictional heat condition would be created about the spindle blade which would cause undue heat and a binding of the parts when the spindle was out of operation and had cooled off.

Ordinarily, the heat generated by the rotation of the parts upon the fibrous impregnated material is just sufficient to cause a slight film of lubricant to exude from the fibrous bearing and this, in all ordinary circumstances, is sufficient to give perfect lubrication and prevent further frictional conditions and consequent rise of temperature. Nevertheless, in overcoming the friction due to the jamming of the blade in the bolster, an undue amount of lubricant is caused to exude, and when the spindles are at rest, this undue film of lubricant tightens the spindle and bolster, and it therefore requires considerable energy to again start the spindle. The result is an increase of frictional condition with the consequent increase of heat which causes improper operation of the impregnated lubricating material. To obviate this, the lower cup 12, has arranged within it the anti-friction bearing 13. This receives the tip of the spindle and being adjustable, the spindle blade may always be set and maintained in definite position and relation with reference to the bolster 10.

It is quite obvious that if the exact condition of fit between the tapered blade 9, and the bolster 10, is maintained, a theoretical and practical approach to perfect lubrication is maintained. With the anti-friction bearing there is practically no wear between the end of the spindle and the step bearing.

This is a distinct improvement upon the device of the prior application heretofore referred to, in which there was a heat generating plug which was made adjustable but which had a substantially blunt spindle point bearing upon it. With the anti-friction bearing herein described, there is practically no wearing away of the end of the spindle and therefore no settling of the spindle blade within the bolster. Furthermore, such heat as is generated between the end of the spindle and the anti-friction bearing is sufficient to cause the fibrous impregnated materials to exude a film of lubricant. Naturally, the anti-friction bearing receives a certain portion of this exudation and with the rapidly rotating ball and spindle, the lubricating material is evenly distributed about the spindle point and rises upon the blade creating just a sufficient film of lubricant to provide perfect lubrication of the parts. Furthermore, the anti-friction step member being mounted in the self-lubricating step-cup does not require any considerable adjustment after the initial adjustment of the parts. There is practically no wear upon the hardened point of the spindle and the anti-friction bearing and therefore no settling. Furthermore, there is the exact centering of the spindle blade with reference to the bolster due to the end support of the spindle.

In Fig. 3, the bolster 17, is shown as counterbored as at 18, and within the counterbore is arranged the anti-friction step member 19. This is supported upon an insulating button 20, which may be raised by an adjusting screw 21. This illustrates the possibility of using a single piece bolster and step-cup. Of course, the bottom of the cup is cut away to permit introduction and adjustment of the anti-friction step and insulating button, but the self-lubricating material surrounds the anti-friction bearing.

In Fig. 4 an arrangement is shown whereby the anti-friction step bearing 22, has a tapered base 23, which permits adjustment by means of a tapered screw 24, through the side of the oil cup rather than through the end. The operation is, of course, the same inasmuch as the anti-friction member is inclosed in the fibrous lubricating step-cup 25.

It will be noted that in either of the cases cited, the metallic part of the spindle with its metallic step is isolated and insulated from the oil cup or casing 6, of the spindle, so that there is no dissipation of heat by radiation or conductance through metallic connections, and in each instance an anti-friction step is made adjustable within a casing of fibrous lubricating material. Thus the step will serve not only as an anti-friction bearing for the end of the spindle but will prevent lowering of the spindle in the bolster and will serve further to distribute such lubricant as is exuded about the step and lower end of the spindle.

It will be seen that the only real point of heat generation is between the end of the spindle of the anti-friction step member and inasmuch as, the lubricant will not exude from the bearing sufficiently to be dissipated, but simply forms a film which gives a substantially perfect lubrication, the importance of the anti-friction bearing is immediately apparent. It is of course understood that the anti-friction step member is inclosed and practically embedded in the self-lubricating material of the step or of the bolster, so that the generation of heat between the spindle and metallic anti-friction step will cause the desired film of lubricating material to be withdrawn from the fibrous parts. As there is no flow of the lubricant to any appreciable extent, it is quite possible to provide a ventilating opening V, through the adjusting plug and step parts as illustrated in the several figures. This has certain advantages in maintaining a constant atmospheric condition within what is ordinarily the closed end of the spindle. Of course, should a liquid lubricant be used, such air ports would be impossible.

Obviously, the exact details of the step bearing and adjusting devices, or for that matter, the bolster and step parts may be varied to a considerable extent without departing from the spirit or intent of the invention which contemplates the ready adjustment of the anti-friction bearing and heat generating member and the bolster to compensate for any inaccuracies of fit or those due to wear.

It is quite apparent that the ball race of the anti-friction bearing might be formed directly in the step part of impregnated material, or the race for the balls might be formed of the impregnated material as a separate element. No matter what material the anti-friction ball bearing with its balls and ball race is made, these parts are closely associated with the bolster of impregnated material and may be inclosed in the step of the same material. It is, of course, entirely feasible with the anti-friction thrust bearing to rely upon the transmission of developed heat to the spindle for withdrawing just a proper degree of lubricant from the impregnated bolster.

What I claim as my invention and desire to secure by Letters Patent is:

1. A spindle bearing embodying a bolster bearing and step bearing formed of fibrous material impregnated with a lubricant, and having a metallic anti-friction step bearing comprising a ball race and balls, said race embedded in the fibrous material and serving as a bearing for the end of the spindle whereby said spindle and metallic step-member generate sufficient heat to withdraw the lubricant from the fibrous bearing members and whereby said lubricant is distributed about the end of the spindle, and an adjusting device for moving the anti-friction member.

2. A spindle bearing embodying a bolster bearing and step bearing formed of fibrous material impregnated with a lubricant, and having a metallic anti-friction step member embedded in the fibrous material and serving as a bearing for the end of the spindle whereby said spindle and metallic member generates sufficient heat to withdraw the lubricant from the fibrous bearing members and whereby said lubricant is distributed about the end of the spindle, and an adjusting device for moving the anti-friction member, and heat insulating means between the adjusting device and anti-friction member for preventing dissipation of heat between the spindle, the bearing and the containing casing of the spindle.

3. A spindle bearing embodying a bolster and a step formed of fibrous material impregnated with a lubricant and having an anti-friction heat generating member embedded in the fibrous material and serving as a thrust for the end of the spindle whereby said spindle and anti-friction member generate sufficient heat to withdraw the lubricant from the fibrous bearing, and a ventilating duct extending into said parts.

4. A spindle bearing embodying a bolster and a step formed of fibrous material impregnated with a lubricant and having an anti-friction heat generating member embedded in the fibrous material and serving as a thrust for the end of the spindle whereby said spindle and anti-friction member generate sufficient heat to withdraw the lubricant from the fibrous bearing, a heat insulating adjusting device for adjusting said anti-friction member, and a ventilating duct extending through said adjusting device.

5. A spindle bearing embodying a bolster formed of fibrous material impregnated with a lubricant and forming a self-lubricating bolster for the spindle, and an anti-friction step bearing consisting of a ball race and balls, said race adjustably supported with reference to the end of the spindle whereby said spindle may be held in fixed relation of adjustment with reference to the self-lubricating bolster, said spindle and anti-friction bearing adapted to generate sufficient heat to withdraw a film of lubricant from the fibrous bearing.

6. A spindle bearing embodying a bolster formed of fibrous material impregnated with a lubricant and forming a self-lubricating bolster for the spindle, and an anti-friction ball bearing step having a raceway adjustably supported with reference to the end of the spindle whereby said spindle may be held in fixed relation of adjustment with reference to the self-lubricating bolster, and whereby said spindle and anti-friction bearing member will generate sufficient heat to withdraw a film of lubricant from the fibrous bearing.

LEIGH S. BACHE.

Witnesses:
 DORA F. APGAR,
 ELOISE LOWANDE.